United States Patent
Baier

(10) Patent No.: US 6,805,326 B1
(45) Date of Patent: Oct. 19, 2004

(54) DEVICE AND METHOD FOR SAVING TRACTION ENERGY IN RAIL VEHICLES

(75) Inventor: Torsten Baier, Schladen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/088,734
(22) PCT Filed: Sep. 20, 2000
(86) PCT No.: PCT/DE00/03320
§ 371 (c)(1),
(2), (4) Date: Jul. 19, 2002
(87) PCT Pub. No.: WO01/21465
PCT Pub. Date: Mar. 29, 2001

(30) Foreign Application Priority Data

Sep. 22, 1999 (DE) .......................................... 199 46 224

(51) Int. Cl.⁷ ................................................. B61F 3/00
(52) U.S. Cl. ...................... 246/182 R; 701/19; 477/108
(58) Field of Search .......................... 477/33, 108, 121; 246/182 R, 182 B; 701/19, 20; 180/170, 179; 340/994

(56) References Cited

U.S. PATENT DOCUMENTS

| 4,142,700 A | | 3/1979 | Ubel et al. | |
| 4,284,051 A | * | 8/1981 | Maisch | 123/490 |
| 5,239,472 A | | 8/1993 | Long et al. | |
| 5,401,223 A | * | 3/1995 | White et al. | 477/108 |
| 5,596,472 A | * | 1/1997 | Roehl | 361/93.6 |
| 5,779,595 A | * | 7/1998 | Kono et al. | 477/174 |
| 6,223,118 B1 | * | 4/2001 | Kobayashi et al. | 701/96 |
| 6,432,025 B1 | * | 8/2002 | Kondo et al. | 477/110 |

FOREIGN PATENT DOCUMENTS

| DE | 12 37 612 | 8/1963 |
| DE | 1 237 612 | 3/1967 |
| DE | 1 663 158 | 8/1971 |
| DE | 26 31 540 | 1/1978 |

* cited by examiner

Primary Examiner—Frantz F. Jules
(74) Attorney, Agent, or Firm—Morrison & Foerster LLP

(57) ABSTRACT

The invention relate to, among other things, a device (5) for a rail vehicle that comprises a control unit (10), which calculates a switch off time using given data and measured values after which the coasting rail vehicle arrives on time at the next stop stipulated by the time-table while adhering to the same. The aim of the invention is to make it possible to reliably detect deviations of the actual travelling characteristics from travelling characteristics recommended by the device. To this end, the invention provides that the device (5) comprises a data input (E5) at which an actual value signal (Si) stating the actual drive switch off time can be input into the device (5), whereby the actual drive switch off time indicates the time at which the drive was actually switched off after the generation of the switch off signal. In addition, the invention provides that the control unit (10) has a memory in which it stores the actual and the respectively assigned recommended drive switch off time (tab, ist; tab, soll) for evaluation.

8 Claims, 1 Drawing Sheet

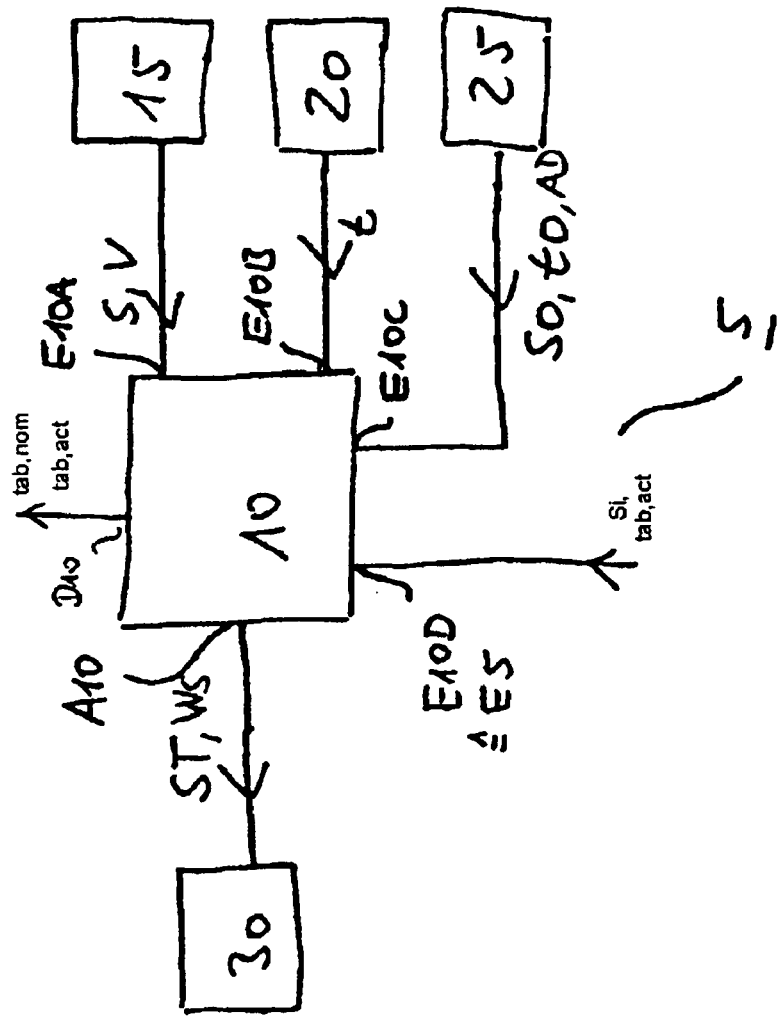

DEVICE AND METHOD FOR SAVING TRACTION ENERGY IN RAIL VEHICLES

CLAIM FOR PRIORITY

This is the national stage of PCT/DE00/03320 filed Sep. 20, 2000 which claims priority to German application 19946224.0 filed on Sep. 22, 1999.

TECHNICAL FIELD OF THE INVENTION

The invention relates to a system and method for a rail vehicle, and in particular, to a system and method for saving traction energy in rail vehicles.

BACKGROUND OF THE INVENTION

A device known from U.S. Pat. No. 5,239,472 is used to save traction energy in rail vehicles. This device has a microprocessor as the control unit, which uses a location measured value, which is detected by a distance measurement device, and route data, which is stored in a memory (storage), to determine the distance between the rail vehicle and the respective next stop. The microprocessor uses a measured time measured value, which indicates the respective real time, and a predetermined stored timetable to determine the traveling time remaining before the rail vehicle reaches the next stop. The microprocessor then uses the distance value and the remaining traveling time, taking into account the respective speed of travel and taking into account the coasting behavior of the rail vehicle, to calculate that time—referred to as the recommended drive switching-off time in the following text—from which the rail vehicle can reach the respective next stop without being driven—that is by coasting or by being braked—in accordance with the timetable. The control unit is connected to an output device in the form of an indicating device. The indicating device is driven by the control unit such that it indicates the term "coast" to signal the time from when the drive for the rail vehicle can be switched off. In the known device, the route data and the predetermined timetable are transferred from a computation unit on the track side to the rail vehicle, where they are stored permanently, before the rail vehicle is brought into use. Thus, the known device is an energy-saving device which indicates the time from when the next stop can be reached in accordance with the timetable without being driven, and thus without consuming energy, using the respective kinetic energy of the rail vehicle.

SUMMARY OF THE INVENTION

The invention relates to a device for a rail vehicle having a control unit which uses a measured location measured value, which indicates the location of the rail vehicle, and predetermined, stored route data, to determine the distance of the rail vehicle from the respective intended next stop. The device uses a measured time measured value, which indicates the respective time, and a predetermined stored timetable to determine the remaining traveling time to the next stop. The device forms a recommended drive switching-off time taking account of the determined distance, the determined remaining traveling time, a speed measured value which indicates the speed of the rail vehicle and predetermined coasting data which describes the coasting behavior of the rail vehicle when the drive is switched off, from which drive switching-off time the rail vehicle will reach the intended next stop on time in accordance with the respective timetable without being driven. An output device, which is connected to the control unit, is driven thereby, and produces a switching-off signal which indicates the recommended drive switching-off time.

According to an aspect of the invention, discrepancies between the actual vehicle behavior and the recommended vehicle behavior can be detected reliably.

According to one aspect of the invention, the device has a data input at which an actual value signal, which indicates the actual drive switching-off time, can be entered into the device, with the actual drive switching-off time indicating that time at which the drive was actually switched off after production of the switching-off signal. The control unit has a memory which stores the actual drive switching-off time and the respective associated, recommended drive switching-off time, for evaluation.

One advantage of the device according to this aspect of the invention is that it possible to detect discrepancies between the actual vehicle behavior of the rail vehicle and the recommended vehicle behavior. This is because the device according to this aspect of the invention has a data input at which an actual value signal, which indicates the actual drive switching-off time, can be entered into the device. When this actual value signal is present, the control unit of the device according to this aspect of the invention can thus store the actual drive switching-off time and the calculated recommended drive switching-off time and/or data signals which indicate these times, in its memory, for subsequent evaluation.

According to another aspect of the invention, to allow discrepancies in the vehicle behavior to be determined quantitatively in the device, the control unit is designed such that it forms a time difference value by forming the difference between the actual drive switching-off time and the respectively associated recommended drive switching-off time.

In some circumstances, a situation may arise in which the rail vehicle driver does not switch off the drive to the rail vehicle without delay despite appropriate signaling by the switching-off signal from the output device, so that a considerable time difference occurs between the recommended drive switching-off time and the actual drive switching-off time, and the desirable energy saving from switching off the drive is reduced or, in some circumstances, is even largely cancelled out. In order to signal this to the rail vehicle driver, according to an aspect of the invention, the control unit has an output and is designed such that it produces a warning signal at its output when the time difference value exceeds a predetermined threshold value. According to this aspect of the invention, the rail vehicle driver is made aware of the time delay, so that he can specifically improve his driving behavior. If, on the other hand, the delay is due to a technical reason in the rail vehicle, then, if the warning signals occur once or more, the device and/or the drive controller for the rail vehicle should be technically inspected and/or serviced.

According to yet another aspect of the invention, the control unit is designed such that it forms a delay value using at least the most recently formed time difference value, and determines the most recent recommended drive switching-off time furthermore taking into account the delay value which has been formed. The switching-off signal is formed using a delay value. The delay value advantageously allows, for example, the reaction time (which is always present) of the rail vehicle driver to be taken into account, with this being the time which passes between the occurrence of the switching-off signal and the rail vehicle driver producing the actual switching-off command. Specifically, if this reaction time is taken into account, then minimum or optimum energy consumption can be achieved despite the unavoidable occurrence of this delay time.

The preferable drive switching-off time can be obtained in a particularly simple, and hence advantageous manner, using the delay value if the control unit is designed such that it first calculates an auxiliary switching-off time, taking account of the determined distance, the determined remaining traveling time, a speed measured value which indicates the speed of the rail vehicle, and predetermined coasting data, which describes the coasting behavior of the rail vehicle when the drive is switched off, from which auxiliary switching-off time the rail vehicle will reach the intended next stop on time in accordance with the respective timetable without being driven, and then forms the difference between the auxiliary switching-off time and the delay value to determine an advanced drive switching-off time, and treats the advanced drive switching-off time as the recommended drive switching-off time.

In order to achieve short traveling times for the rail vehicle overall, it is preferable to avoid the rail vehicle coming to rest just by coasting to the stop since, specifically, in some circumstances coasting at very low speeds may cost a large amount of time. For this reason, the rail vehicle is generally braked in accordance with a predetermined braking profile on reaching a minimum speed. In order to take account of this situation, according to an aspect of the invention, the control unit is designed such that it determines the recommended drive switching-off time by additionally taking into account a predetermined braking profile and a predetermined minimum speed which, if undershot, would result in the rail vehicle being braked in accordance with the predetermined braking profile when it is approaching the next stop without being driven.

The invention also discloses discrepancies between the actual vehicle behavior and the recommended vehicle behavior detected reliably.

According to another aspect of the invention, there is an evaluation device which is connected to a data output, which reads the stored actual drive switching-off time and the respective associated, recommended drive switching-off time, and forms a time difference value by forming the difference between the actual drive switching-off time and the associated recommended drive switching-off time. The evaluation device may, in this case, be an evaluation device on the track side which, for example, is connected via a wire link or a radio link to the data connection of the device according to the invention.

BRIEF DESCRIPTION OF THE DRAWINGS

FIG. 1 shows an exemplary embodiment of a device according to the invention.

DETAILED DESCRIPTION OF THE PREFERRED EMBODIMENTS

FIG. 1 shows a device 5 for a rail vehicle, which is not illustrated, with a control unit 10, having one of inputs E10A connected to a measurement device 15. The measurement device 15 may be, for example, an odometer which uses the wheel revolutions of the rail vehicle to determine the respective speed of the rail vehicle and the distance which has already been traveled in each case, and hence to determine the respective location S of the rail vehicle. A timer, which is in the form of a clock 20, and transmits the respective real time t as a time measured value to the control unit 10, is preferably arranged upstream of the control unit 10, at a further input E10B of the control unit 10.

An additional input E10C of the control unit 10 is preferably connected to a memory 25, in which route data and a timetable with which the rail vehicle is bound to comply are permanently stored. Furthermore, the memory 25 includes coasting data AD, which describes the coasting behavior of the rail vehicle when the drive is switched off. The coasting data AD may be, for example, previously measured data, which has been measured in advance while the rail vehicle was coasting, that is with the drive switched off.

The control unit 10 furthermore may have a supplementary input E10D, at which an actual value signal Si, which indicates the actual drive switching-off time, can be applied to the control unit 10. The supplementary input E10D of the control unit 10 at the same time forms a data input E5 for the device 5.

The control unit 10 may also be equipped with a data output D10, at which data and/or data signals which is or are stored in a memory (not illustrated) of the control unit 10 can be read, for example using an evaluation device (not illustrated) (personal computer or some type of data processing system).

One output A10 of the control unit 10 leads to an output device 30.

The device 5 can be operated as follows:

1. Initial operation of the device 5:

First, the measurement device 15 and the clock 20 are preferably checked by the control unit 10. In the process, a location measured value S, which indicates the respective location of the rail vehicle, a speed measurement variable V, which indicates the respective speed of the rail vehicle, and a time measured value T, which indicates the respective real time are transmitted to the control unit 10.

The control unit 10 then preferably reads from the memory 25, as route details or route data, the location S0 of the respective next stop and a nominal arrival time t0. The nominal arrival time t0 in this case indicates the real time at which the rail vehicle should have reached the respective next stop. Furthermore, the control unit 10 checks the coasting data AD stored in the memory 25.

A recommended drive switching-off time tab,nom is then determined from the nominal arrival time t0, the location measured value S, the location S0 of the next stop, the speed V and the coasting data AD for the rail vehicle, from which recommended drive switching-off time tab,nom the rail vehicle will reach the next stop with its drive switched off, utilizing its kinetic energy and in accordance with the modified timetable.

In order to achieve short rail vehicle traveling times overall, it is generally necessary to avoid the rail vehicle coming to rest just by coasting to the stop, since, specifically, coasting at very low speeds may in some circumstances cost a large amount of time. For this reason, once its speed falls below a predetermined minimum speed, the rail vehicle is generally braked in accordance with a predetermined braking profile. In order to take account of this situation, it is also possible to provide for the recommended drive switching-off time tab,nom to be determined in the computation unit 10 while also taking into account the predetermined braking profile and the predetermined minimum speed.

The way in which the recommended drive switching-off time tab,nom can be determined using these input parameters—that is the nominal arrival time t0, the location measured value S, the location S0 of the next stop, the speed V and the coasting data AD, possibly together with any predetermined minimum speed and any predetermined braking profile—is described in detail in the U.S. Pat. No. 5,239,472. The content of the '472 patent is hereby incorporated by reference.

Once the recommended drive switching-off time tab,nom has been determined, it is stored in the memory, which is not illustrated, of the control unit 10. Furthermore, the control device 10 forms a drive signal ST for the output device 30. The output device 30 then preferably produces a switching-off signal, which indicates the drive switching-off time. As in the case of the already known device mentioned initially, the switching-off signal may be, for example, a visual indication which, by displaying the term "coast", signals that the coasting process can be started. Instead of this, this may also be an indication which displays or indicates the drive switching-off time visually and/or audibly in the form of a time indication.

Once the device 5 has produced the switching-off signal, it then waits at its data input E5 for an actual value signal Si which indicates the actual drive switching-off time tab,act. The actual value signal thus indicates when the drive of the rail vehicle was actually switched off by the rail vehicle driver. An actual value signal Si such as this may be produced, for example, by a monitoring device which is not shown in the figure, is connected to the data input E5 of the device 5 and to the drive of the rail vehicle, and in each case forms a logic output signal with a logic "1" as the actual value signal Si, and emits this to the device 5, when the drive of the rail vehicle is switched off, and which in each case forms a logic output signal with a logic "0" as the actual value signal Si, and emits this to the device 5, when the drive of the rail vehicle is switched on.

The device 5, or the control unit 10, then uses a signal change from a logic "0" to a logic "1" to identify the fact that the drive of the rail vehicle has been switched off; the time of the signal change thus corresponds to the actual drive switching-off time tab,act. Since the actual drive switching-off time tab,act is contained as information (signal change) in the actual value signal Si, the reference symbol tab,act has been applied to the input E5 of the device 5 in the figure.

The control unit 10 stores this actual drive switching-off time tab,act in its memory, and then uses the actual drive switching-off time tab,act and the recommended drive switching-off time tab,nom to form, by subtraction, a time difference value $\Delta t$:

$$\Delta t = tab,act - tab,nom.$$

The control unit 10 then compares the time difference value $\Delta t$ with a predetermined threshold value which, for example, may be one second, and produces a warning signal WS at its output A10 if the time difference value $\Delta t$ is greater than the predetermined threshold value. The warning signal Ws is then emitted in suitable form, for example visually or audibly, by the output device 30.

Furthermore, the control unit 10 uses the time difference value $\Delta t$ to form a delay value V in accordance with $$V = a * \Delta t$$

where a is a factor between zero and unity. The following section explains how the factor a can be chosen.

The delay value V is stored by the device 5, for example in the memory 25.

2. Further operation of the device 5 once a delay value V has been determined and has been stored in the device 5:

If a stored delay value V is already available, the procedure for forming the switching-off signal is different to that described above. This is because, in addition, the stored delay value V, as determined in the respective previously carried out drive switching-off cycle, is also taken into account in the calculation of the recommended drive switching-off time. Specifically, an auxiliary switching-off time is initially determined once for this purpose, to be precise using the nominal arrival time t0, the location measured value S, the location S0 of the next stop, the speed V and the coasting data AD, possibly together with any predetermined minimum speed and any predetermined braking profile. The auxiliary switching-off time is in this case determined in the same way as the determination of the recommended switching-off time when no delay value V is yet available or has yet been stored (see the description relating to item 1, Initial operation of the device 5).

The recommended drive switching-off time tab,nom is then formed in the control unit 10 using the auxiliary switching-off time and the delay value V using:

$$tab,nom = taux - V$$

where taux denotes the auxiliary switching-off time.

The recommended drive switching-off time tab,nom is thus advanced by the time interval which is defined by the delay value V, considered figuratively, with respect to the actually "correct" auxiliary switching-off time taux. If the factor a is in this case equal to unity, then this means that the drive switching-off time is advanced by the time difference value $\Delta t$; the factor a=1 should thus be chosen when it can be assumed that the reaction time of the rail vehicle driver is largely constant. If, however, it can be expected that the reaction time of the rail vehicle driver to the next switching-off command may be shorter than that when the drive was respectively most recently switched off, then the factor a should be chosen to be somewhat less than unity, in order to avoid the drive being switched off too early.

Once the recommended drive switching-off time tab,nom has been determined, the switching-off signal is produced in the manner already described in item 1, Initial operation of the device 5.

Furthermore, it is also possible to determine the recommended drive switching-off time taking account of a number, or else of all, the respective previously formed time difference values. For example, the delay value V can be formed as a mean value—or possibly also as a weighted mean value—for this purpose:

$$V = a * \frac{1}{i} \sum_i (\Delta ti * bi)$$

where $\Delta ti$ denotes the stored previously formed time difference values and bi denotes weighting factors by means of which it is possible, for example, to decide that more recent time difference values are taken into account to a greater extent than older time difference values.

At its data output D10 the control unit 10 emits data signals which indicate the actual drive switching-off time tab,act and the respective associated, recommended drive switching-off time tab,nom. These data signals, and hence the corresponding times, can thus be read at the data output D10, by a downstream evaluation device. This evaluation device may be, for example, a device on the rail side, which is connected via a radio link or some other type of data link to the device 5 and/or to the data output D10 of the control unit 10.

A statistical evaluation of the data stored in the control unit 10 can thus be carried out in the evaluation device; specifically, the actual drive switching-off times tab,act and the respective associated, recommended drive switching-off times tab,nom can thus be evaluated, for example in order to check whether the device 5 is operating correctly.

What is claimed is:

1. A device for a rail vehicle having a control unit, which:

determines a distance between the rail vehicle and a respective intended next stop using a measured location measured value which indicates a location of the rail vehicle, and predetermined, stored route data, determines a remaining traveling time to the next stop using a measured time measured value, which indicates a respective time, and a predetermined, stored timetable, and forms a recommended drive switching-off time taking account of the determined distance, of the determined remaining traveling time, of a speed measured value, which indicates the speed of the rail vehicle, and predetermined coasting data, which describes the coasting behavior of the rail vehicle when a drive of the rail vehicle is switched off, from which drive switching-off time the rail vehicle will reach the intended next stop on time in accordance with the respective timetable without being driven, and having an output device which is connected to the control unit and is driven by the control unit, and which produces a switching-off signal which indicates the recommended drive switching-off time, wherein the device has a data input at which an actual value signal which indicates the actual drive switching-off time can be entered in the device, with the actual drive switching-off time indicating that time at which the drive is actually switched off after the switching-off signal was produced, and the control unit has a memory which stores the actual drive switching-off time and the respectively associated, recommended drive switching-off time, for evaluation, wherein the control unit is designed such that it forms a time difference value by forming the difference between the actual drive switching-off time and the respectively associated recommended drive switching-off time, the control unit is designed such that it forms a delay value using at least the respectively most recently formed time difference value, and determines the respectively most recent recommended drive switching-off time furthermore taking into account this delay value which has been formed, and the control unit is designed such that it calculates an auxiliary switching-off time, taking account of the determined distance, the determined remaining traveling time, the speed measured value, which indicates the speed of the rail vehicle, and the predetermined coasting data, which describes the coasting behavior of the rail vehicle when the drive is switched off, from which said auxiliary switching-off time the rail vehicle will reach the intended next stop on time in accordance with the respective timetable without being driven, and forms the difference between the auxiliary switching-off time and the delay value to determine an advanced drive switching-off time, and treats the advanced drive switching-off time as the recommended drive switching-off time.

2. The device as claimed in claim 1, wherein the control unit has an output and is designed such that the control unit produces a warning signal at its output when the time difference value exceeds a predetermined threshold value.

3. The device as claimed in claim 1, wherein the control unit is designed such that it determines the recommended drive switching-off time by additionally taking into account a predetermined braking profile and a predetermined minimum speed which, if not met, would result in the rail vehicle being braked in accordance with the predetermined braking profile in the phase when it is approaching the next stop without being driven.

4. An arrangement having a device as claimed in claim 1 and having an evaluation device which is connected to a data output of the device, which evaluation device reads from the device data signals which indicate the stored actual drive switching-off time and the respective associated, recommended drive switching-off time, and forms a time difference value by forming the difference between the actual drive switching-off time and the associated recommended drive switching-off time.

5. The arrangement as claimed in claim 4, wherein the evaluation device is an evaluation device on the track side.

6. A method for producing a switching-off signal, comprising:

determining a distance between a rail vehicle and a respectively intended next stop taking into account a measured location measured value, which indicates a location of the rail vehicle, and predetermined stored route data, determining a remaining traveling time to the next stop taking into account a measured time measured value, which indicates a respective time, and a predetermined, stored timetable, and forming a recommended drive switching-off time from which the rail vehicle will reach the intended next stop on time in accordance with the respective timetable without being driven by taking account of the determined distance between the rail vehicle and the respectively intended next stop, the determined remaining traveling time, a speed measured value which indicates a speed of the rail vehicle, and predetermined coasting data, which describes coasting behavior of the rail vehicle when a drive of the rail vehicle is switched off, and producing a signal which indicates the recommended drive switching-off time as the switching-off signal, wherein the actual drive switching-off time is determined at a time in which the drive was actually switched off after producing the switching-off signal, and a time difference value is, in each case, formed by forming a difference between the actual drive switching-off time and the respective recommended drive switching-off time, wherein a delay value is formed using at least the respective most recently formed time difference value, and the respective most recent recommended drive switching-off time is determined furthermore taking into account this delay value which has been formed, and taking account of the determined distance, the determined remaining traveling time, the speed measured value which indicates the speed of the rail vehicle, and the predetermined coasting data, which describes the coasting behavior of the rail vehicle when the drive is switched off, an auxiliary switching-off time is calculated from which the rail vehicle will reach the intended next stop on time in accordance with the respective timetable without being driven, and by forming the difference between the auxiliary switching-off time and the delay value, an advanced drive switching-off time is determined, and the advanced drive switching-off time is treated as the respective most recent recommended drive switching-off time.

7. The method as claimed in claim 6, wherein a warning signal is produced if the time difference value exceeds a predetermined threshold value.

8. The method as claimed in claim 6, wherein the recommended drive switching-off time is determined by additionally taking into account a predetermined braking profile and a predetermined minimum speed which, if not met, would result in the rail vehicle being braked in accordance with the predetermined braking profile when the rail vehicle is approaching the next stop without being driven.

* * * * *